US008734219B2

(12) United States Patent
Thornton et al.

(10) Patent No.: US 8,734,219 B2
(45) Date of Patent: May 27, 2014

(54) SYSTEM AND METHOD FOR EX POST RELATIVE SKILL MEASUREMENT IN POKER

(71) Applicant: Skill in Games LLC, New York, NY (US)

(72) Inventors: David Thornton, New York, NY (US); Emilio Seijo, New York, NY (US)

(73) Assignee: Skill in Games LLC, New York, NY (US)

( * ) Notice: Subject to any disclaimer, the term of this patent is extended or adjusted under 35 U.S.C. 154(b) by 0 days.

(21) Appl. No.: 13/901,836

(22) Filed: May 24, 2013

(65) Prior Publication Data

US 2014/0004918 A1 Jan. 2, 2014

Related U.S. Application Data

(60) Provisional application No. 61/667,064, filed on Jul. 2, 2012.

(51) Int. Cl.

| | |
|---|---|
| ***A63F 9/24*** | (2006.01) |
| ***A63F 13/00*** | (2014.01) |
| ***A63F 1/00*** | (2006.01) |

(52) U.S. Cl.
USPC .................. 463/13; 463/16; 463/20; 273/292

(58) Field of Classification Search
USPC ....................... 463/9, 13, 16, 25, 42; 273/292
See application file for complete search history.

(56) References Cited

U.S. PATENT DOCUMENTS

| | | | | |
|---|---|---|---|---|
| 8,152,618 | B1 * | 4/2012 | Blay et al. | 463/13 |
| 8,182,326 | B2 | 5/2012 | Speer, II et al. | |
| 8,246,466 | B2 | 8/2012 | Herrmann et al. | |
| 8,277,324 | B2 | 10/2012 | Herrmann et al. | |
| 8,308,546 | B2 | 11/2012 | Kroeckel et al. | |
| 8,317,588 | B2 | 11/2012 | Kroeckel et al. | |
| 2004/0254005 | A1 | 12/2004 | Shackleford et al. | |
| 2008/0088087 | A1 * | 4/2008 | Weitzman et al. | 273/292 |
| 2008/0113815 | A1 * | 5/2008 | Weingardt | 463/42 |
| 2008/0248851 | A1 * | 10/2008 | Bloom | 463/16 |
| 2009/0191934 | A1 * | 7/2009 | Larson | 463/13 |
| 2010/0120502 | A1 | 5/2010 | Oberberger | |

(Continued)

OTHER PUBLICATIONS

Johanson, Michael, et al., "Evaluating State-Space Abstractions in Extensive-Form Games", International Foundation for Autonomous Agents and Multiagent Systems, 2013, 8 pgs. Retrieved from the Internet: < http://poker.cs.ualberta.ca/publications/AAMAS13-abstraction.pdf >.

(Continued)

*Primary Examiner* — Dmitry Suhol
*Assistant Examiner* — Jason Yen
(74) *Attorney, Agent, or Firm* — Kwan & Olynick LLP

(57) ABSTRACT

Techniques and mechanisms described herein facilitate the determination of a relative skill score for a poker player. According to various embodiments, a first expected stack value for a designated player may be determined prior to a voluntary player action event associated with the designated player in a poker hand. A second expected stack value for the designated player may be determined after the voluntary player action event. A designated relative skill score for the designated player may be determined by calculating a difference between the second expected stack value and the first expected stack value. The designated relative skill score may be stored on a storage medium.

14 Claims, 7 Drawing Sheets

(56) References Cited

U.S. PATENT DOCUMENTS

| | | | | |
|---|---|---|---|---|
| 2011/0117997 | A1 | 5/2011 | Kroeckel et al. | |
| 2011/0204569 | A1* | 8/2011 | Porter | 273/292 |
| 2011/0212766 | A1* | 9/2011 | Bowers et al. | 463/25 |
| 2012/0015708 | A1 | 1/2012 | Kroeckel et al. | |
| 2012/0264496 | A1 | 10/2012 | Behrman et al. | |
| 2012/0270626 | A1* | 10/2012 | Bell et al. | 463/16 |
| 2013/0005421 | A1* | 1/2013 | Barzilay et al. | 463/9 |

OTHER PUBLICATIONS

Archibald, Christopher, et al., "Rating Players in Games with Real-Valued Outcomes (Extended Abstract)", International Foundation for Autonomous Agents and Multiagent Systems, 2013, 2 pgs. Retrieved from the Internet: < http://poker.cs.ualberta.ca/publications/AAMAS13-ratings.pdf >.

Davidson, Joshua, et al., "Baseline: Practical Control Variates for Agent Evaluation in Zero-Sum Domains", International Foundation for Autonomous Agents and Multiagent Systems, 2013, 8 pgs. Retrieved from the Internet: < http://poker.cs.ualberta.ca/publications/AAMAS13-baseline.pdf >.

Johanson, Michael, et al., "Finding Optimal Abstract Strategies in Extensive-Form Games", Association for the Advancement of Artificial Intelligence, 2012, 9 pgs. Retrieved from the Internet: < http://poker.cs.ualberta.ca/publications/AAAI12-cfrbr.pdf >.

Kan, Morgan Hugh, "Postgame Analysis of Poker Decisions", Department of Computing Science, University of Alberta, 2007, 109 pgs. Retrieved from the Internet: < http://poker.cs.ualberta.ca/publications/kan.msc.pdf >.

Billings, D., et al., "Approximating Game-Theoretic Optimal Strategies for Full-scale Poker", Department of Computing Science, University of Alberta, 8 pgs. Retrieved from the Internet: < http://poker.cs.ualberta.ca/publications/IJCAI03.pdf >.

Pena Castillo, Maria de Lourdes, "Probabilities and Simulations in Poker", Department of Computing Science, University of Alberta, 1999, 73 pgs. Retrieved from the Internet: < http://poker.cs.ualberta.ca/publications/pena.msc.pdf >.

Papp, Denis Richard, "Dealing with Imperfect Information in Poker", Department of Computing Science, University of Alberta, 93 pgs. Retrieved from the Internet: < http://poker.cs.ualberta.ca/publications/papp.msc.pdf >.

"Int'l Application Serial No. PCT/US2013/042587, Search Report & Written Opinion mailed Oct. 8, 2013", 8 pgs.

Billings, et al., "A Tool for the Direct Assessment of Poker Decisions", ICGA Journal, vol. 29, [retrieved on Sep. 25, 2013]. Retrieved on the Internet:<URL:http://poker.cs.ualberta.ca/publications/divat-icgaj.pdf> entire document, Jan. 2006, pp. 119-142.

* cited by examiner

SYSTEM AND METHOD FOR EX POST RELATIVE SKILL MEASUREMENT IN POKER

CROSS-REFERENCE TO RELATED APPLICATIONS

This application claims priority under 35 U.S.C. §120 to Provisional U.S. Patent Application No. 61,667,064, titled "System and Method for Ex Post Relative Skill Measurement in Poker", by David Thornton and Emilio Seijo, filed Jul. 2, 2012, which is hereby incorporated by reference in its entirety and for all purposes.

TECHNICAL FIELD

The present disclosure relates generally to the field of wager-based gaming, and particularly to the measurement of skill in the game of poker.

DESCRIPTION OF RELATED ART

Federal, state, and local laws in the United States, as well as the laws of various international jurisdictions, make legal distinctions between games of skill and games of chance. Relevantly, in some jurisdictions, games of skill are legal, while games of chance are not. Additionally, some jurisdictions provide for differential tax treatment as between monetary winnings from games of skill, and monetary winnings from games of chance.

This distinction is particularly relevant for the class of games called mixed games, which have elements of both skill and chance. Poker is one such mixed game. (In contrast, chess is a game of pure skill, and flipping a fair coin is a game of pure chance.) Often, the law will deem a mixed game to be a game of skill upon demonstration that skill contributes some minimum amount to the outcome of an average game.

However, there is not currently a method for objectively measuring the relative skill of a player in a single poker hand. Without such a method, it is impossible to empirically estimate the average contribution of skill to poker outcomes. And without such an estimate, poker remains—in many jurisdictions—in legal limbo with respect to the skill/chance distinction.

The computer-facilitated methods in this provisional filing provide ways to objectively measure the relative skill of a player in a single poker hand. Therefore these methods also make it possible to empirically estimate the average contribution of skill to poker outcomes. It follows that these methods facilitate the operationalization of the "game of skill" legal distinction, as that distinction applies to poker.

In addition to operationalizing the game of skill legal distinction in the case of poker, objective measurement of the relative skill of a poker player in a single hand has a number of applications. These applications include, but are not limited to: helping to identify pathological playing behavior, matching poker players by skill, catching poker cheats, creating poker player improvement tools, and comparing the relative skill of individual poker players, both at a given moment in time, as well as over the course of time.

SUMMARY

Described herein are techniques and mechanisms including methods, apparatus, systems, and computer readable media having instructions stored thereon for determining relative skill measurements. According to various embodiments, a system may include a communications interface, a processor, and a storage system.

According to various embodiments, a first expected stack value for a designated player may be determined prior to a voluntary player action event associated with the designated player in a poker hand. A second expected stack value for the designated player may be determined after the voluntary player action event. A designated relative skill score for the designated player may be determined by calculating a difference between the second expected stack value and the first expected stack value. The designated relative skill score may be stored on a storage medium.

According to various embodiments, a plurality of relative skill scores may be determined for the designated player during the poker hand. Each of the plurality of relative skill scores may be associated with a respective one of a plurality of betting rounds. The plurality of relative skill scores may include the designated relative skill score.

According to various embodiments, an aggregate relative skill score for the designated player during the poker hand may be determined by calculating a sum of the plurality of relative skill scores.

According to various embodiments, determining the designated relative skill score may include subtracting an effect of one or more chance events from the difference between the second and first expected stack values.

According to various embodiments, each expected stack value may represent a first amount of money or chips that the designated player possesses at a given time combined with a second amount of money or chips that the designated player will receive in expectation from one or more pots associated with the poker hand.

According to various embodiments, the amount of money or chips that the designated player will receive in expectation from a pot may be calculated by summing the product of the probability that the designated player will win the pot and the value of the pot if won with a sum of the products of the probability that the designated player will share the pot and the value of the pot if shared, for all unique combinations of opponents with whom the player may share the pot.

According to various embodiments, the first and second expected stack values may be determined based on hand history information. The hand history information may describe each player's stack at the start of the hand and the events that occurred over the course of the hand.

According to various embodiments, the first expected stack value may be determined at the beginning of the betting round. The second expected stack value may be determined at the end of the betting round.

According to various embodiments, the first expected stack value may be determined immediately prior to the voluntary player action event. The second expected stack value may be determined immediately prior to a subsequent voluntary player action event associated with the designated player.

According to various embodiments, the betting round may include a plurality of voluntary player actions. The plurality of voluntary player actions may include the voluntary player action event.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
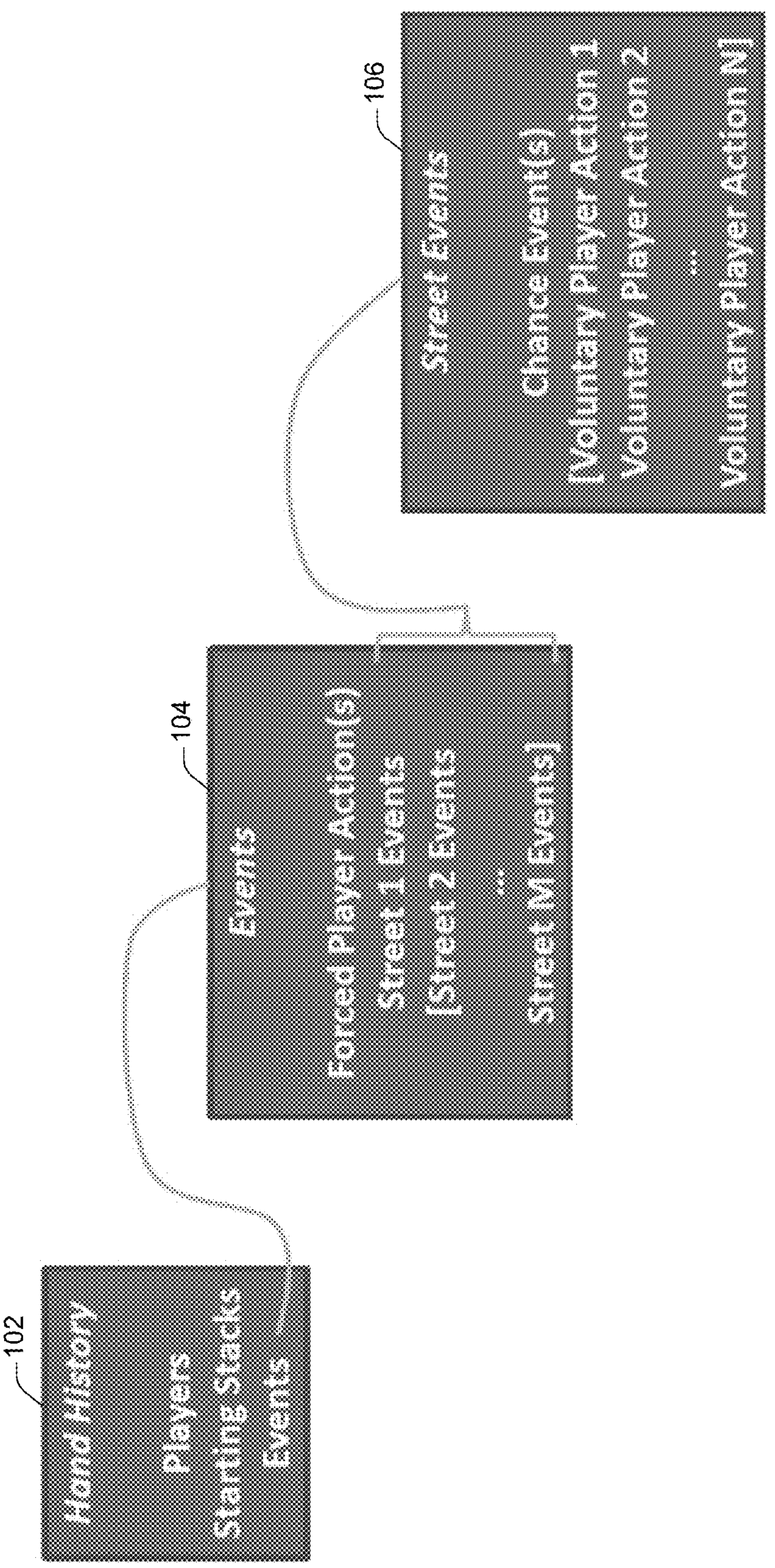
FIG. 1 illustrates a visual schematic of an example of a history of a completed poker hand, referred to herein as a hand history.

Reference will now be made in detail to some specific examples including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of poker. However, it should be noted that the techniques of the present invention apply to a wide variety of games. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate the measurement of the relative skill levels of poker players. Such techniques and mechanisms may allow identifying pathological playing behavior, matching players based on skill level, identifying individuals who are cheating, facilitating the creation of player improvement tools. Alternately, or additionally, techniques and mechanisms described herein may facilitate comparing the skill of different players at a given moment in time and/or over the course of time.

Example Embodiments

According to various embodiments, techniques and mechanisms described herein may be applied to measure skill in a variety of contexts. Many techniques and mechanisms are described herein with reference to the game of poker. However, various techniques and mechanisms may be widely applicable to mixed games that combine elements of both chance and skill to determine game outcomes.

In a given poker hand, after players have made the initial choice to participate in the hand, there are three types of events that influence players' final outcomes. In most poker variants, these three types of events are mutually exclusive and collectively exhaustive.

One type of event is forced player action. Depending on the variant of poker, forced player action may refer to either the payment of antes by some or all players, the posting of forced bets by some or all players, or some combination thereof.

Another type of event is a chance event such as the dealing of cards. Since cards are dealt at random, the dealing of cards is appropriately categorized as involving only chance and not skill.

Yet another type of event is voluntary player action. A voluntary player action is an action taken by a player during a betting round. Since voluntary player action involves player choice, a voluntary player action is appropriately categorized as a relative skill event. Accordingly, in some implementations, relative skill may be defined with respect to voluntary player actions and may be independent of other events such as forced player actions and the dealing of cards.

Poker hands typically begin with forced player actions. For instance, in most variants of Texas Hold'em poker, there will be at least one player who is forced to make a bet before cards are initially dealt. Subsequently, there is at least one, and may be many, streets. Each street starts with a chance event. For instance, in most variants of Texas Hold'em poker, each player is individually dealt two private cards before the preflop betting round. The cards that are dealt during this chance event may be individually held or may be shared between all players, and the identities of the cards may also be public or private. After the chance event, each active player—defined as a player who has not yet folded, and who still has money or chips to wager—takes at least one voluntary action. For instance, a player may fold, bet, raise, check, or call.

According to various embodiments, relative skill may be measured based on changes to a player's expected stack, or expected payoff value. A player's expected stack represents an amount of money or chips that the player will possess in expectation. Thus, a player's expected stack includes not just the amount of money or chips that the player actually possesses (his "current stack"), but also the amount of money or chips that the player expects to receive from any all pots in which the player has a stake (his "expected winnings"). In particular, a player's expected stack is equal to his current stack plus his expected winnings.

According to various embodiments, a player's current stack, at a given point in the hand, may be defined as the amount of money or chips that a player possesses and that has not been committed to any pot. For instance, a player may start a hand with an initial stack of $100. Then, after placing various bets during the hand which, taken together total $15, the player's stack may drop to $85 at some point in the hand.

According to various embodiments, a pot at a given point in the hand may be defined by an aggregate amount of money that has been wagered by two or more players in a given hand, through some combination of player actions (e.g., calls, raises) in that hand. It should be noted that a hand at a given point in time may contain potentially many different pots. For instance, all non-folded players currently in the hand may have access to the "main" pot. However, if one or more players is "all in" and has no more funds to contribute to the $n^{th}$ pot, then the non-all in players may have access to the $n+1^{th}$ pot, which will not include all non-folded players.

According to various embodiments, a player's expected winnings from a particular pot, at a given point in the hand, may be determined based on the probabilities of winning the entire pot or a share of the pot, the amount of money or chips in the pot, and the number of opponents with whom the player may end up sharing the pot. For instance, the probability of a player winning the pot outright may be multiplied by the amount of money or chips in the pot. Then, for each combination of opponents with whom the player may end up sharing the pot, the probability of a player winning a share of the pot may be multiplied by the amount of money or chips in the pot and divided by the number of opponents with whom he/she will equally share the pot. Next, these values may be added together to determine a player's expected winnings from that particular pot.

According to various embodiments, the probability of a player winning or sharing a particular pot, at a given point in the hand, may be determined based on information such as the player's cards, the cards held by the player's opponents competing for that pot, the cards held by the player's opponents who have not folded, but are not competing for that pot (for example, an opponent who previously went all-in and has not contributed money or chips to the pot under consideration), the cards previously held by the player's opponents who had previously folded, any cards that are currently shared between the player and his non-folded opponents, and the cards that may yet be dealt.

According to various embodiments, the probability that a player will win or share a particular pot may be determined in any of a variety of ways. In some implementations, the probability may be determined at least in part by enumerating all possible combinations of cards that may result from dealing additional cards from the deck. For instance, if two cards remain undealt, then the cards currently dealt may be combined with every possible draw of the two remaining cards to enumerate the possibilities. Then, the winning, losing, and tied combinations from the enumeration may be aggregated to determine the probabilities associated with each outcome.

In some implementations, the probability that a player will win or share a particular pot may be determined at least in part by isomorphic enumeration. For example, in some situations in which probability is to be calculated, the ace of spades is functionally equivalent to the ace of hearts. Therefore, rather than enumerating all possible combination of cards in order to calculate probability, the system may enumerate functionally distinct combination of cards.

In some implementations, the probability that a player will win or share a particular pot may be determined at least in part by combinatorial analysis. For instance, the system may combinatorially determine all possible categories of card draws in which one player will have a stronger, weaker, or equal hand when compared with another player. Then, the combinatorial results may be aggregated to determine the probabilities associated with each outcome.

In some implementations, the probability that a player will win or share a particular pot may be determined at least in part by heuristic calculation. For example, at the turn, a player may have four possible river cards that may provide the player with a winning hand. In such a situation, a commonly applied heuristic is that "with one card to come, the probability of winning is two times the number of cards that may provide the player with a winning hand." Thus, the player would heuristically have approximately an 8% chance of winning.

According to various embodiments, relative skill may be defined with respect to voluntary player actions, and may be calculated by measuring changes in a player's expected stack. Thus, according to various embodiments, relative skill may be conceptualized as the changes in a player's expected stack related to that player's voluntary player actions.

In certain implementations, choices may be made about when to measure a player's expected stack. For example, if an implementor is measuring a player's change in expected stack related to that player's first voluntary player action in a given betting round, the initial expected stack calculation might be performed as of the beginning of the betting round (i.e. before any players have taken a voluntary player action in that betting round), or immediately prior to the player's first voluntary action in that betting round. As another example, if an implementor is measuring a player's change in expected stack related to that player's last voluntary player action in a given betting round, one expected stack calculation might be performed as of the end of the betting round (i.e. after all players have taken their last voluntary player action in that betting round), or, when there is a subsequent betting round, immediately prior to the player's first voluntary action in the next betting round.

In other implementations, the implementor may not have to make choices about when to measure a player's expected stack. For example, if an implementor is measuring a player's change in expected stack for the player's second voluntary player action in a betting round during which the player took at least three voluntary player actions, one measurement might be taken immediately prior to the player's second voluntary player action, and another measurement might be taken immediately prior to the player's third voluntary player action.

In certain implementations, the changes in a player's expected stack due solely to chance events may be removed from the overall measurement of that player's change in expected stack. For a given chance event, this removal may be accomplished by calculating a player's expected stack immediately prior to that chance event, calculating it again immediately after that chance event, and subtracting the difference between these two calculations from the overall measurement of the player's change in expected stack.

FIG. 1 illustrates a visual schematic of an example of a history of a completed poker hand, referred to herein as a hand history. According to various embodiments, a hand history includes the information necessary to reconstruct the events that occurred in a poker hand. The visual schematic shown in FIG. 1 includes a hand history 102, an events list 104, and a street events list 106.

At 102, an example of a hand history is shown. According to various embodiments, a hand history may be used to measure relative skill. A hand history may include information uniquely identifying the players participating in the hand. A hand history may also include information describing each player's stack, or amount of chips or money, that the player possesses at the start of the hand. Additionally, the hand history may include the events that occurred over the course of the hand.

At 104, a list of events that occurred during the hand is shown. According to various embodiments, descriptions of the events in the hand must make it possible to discern the temporal order in which these events occurred. For variants of poker in which the forced player action events apply equally to all players, descriptions of the forced player action events may report at least the amount of the forced player action. For example, in some variants of poker, all players must contribute the same ante. For variants of poker in which the forced player action events do not apply equally to all players, description of each forced player action event may contain the following information: the unique identifier of the player making the forced action, the type of the forced action, and either implicitly or explicitly, the amount of the forced action. For example, in some variants of poker, certain players must make forced bets that are different (by their forced nature) than the voluntary bets contributed by other players. For instance, depending on the variant of poker, a forced bet may be a big blind, a small blind, or a non-blind post, or some other type of forced bet.

At 106, a list of events that occurred during streets in the poker hand is shown. According to various embodiments, events that occurred during streets in the poker hand may include chance events, such as the events in which cards were dealt, and voluntary player actions, such as choices by players to perform actions such as raising, calling, or folding. Descriptions of the events in which cards were dealt may include the identities of the cards dealt, and either implicitly or explicitly, the identity of the betting round which those cards immediately preceded. Further, when one or more cards are dealt privately to an individual player (and not publicly, to be shared by all players), the description of those cards may include the unique identifier of the player to which the cards were dealt. Descriptions of each of the voluntary actions taken by the players in the hand may include: the unique identifier of the player taking the voluntary action, the type of voluntary action taken, and either implicitly or explicitly, the amount of the voluntary action.

According to various embodiments, hand history data may be provided by an online or other computerized gaming system. This system may stream or otherwise deliver the data electronically to the software which processes and determines relative skill measurements for the players. For instance, the system may deliver the data via FTP, data requests from a server, or other data transfer techniques.

According to various embodiments, hand history data may be provided by analyzing poker play at physical poker tables. Such data may be collected and analyzed in real time or aggregated for analysis at a later time. For example, live action poker tournaments may be analyzed to measure the relative skill of participants. As another example, the play of a poker player in a casino may be analyzed to determine a relative skill measurement for the player.

In some implementations, hand history data for a physical poker table may be collected by analyzing data received from various types of sensors located at or near the poker table. These types of sensors may include, but are not limited to: optical sensors such as cameras, RFID devices, other types of near-field communication devices, or any other devices capable of being used to determine the identities of cards.

Figure 2:
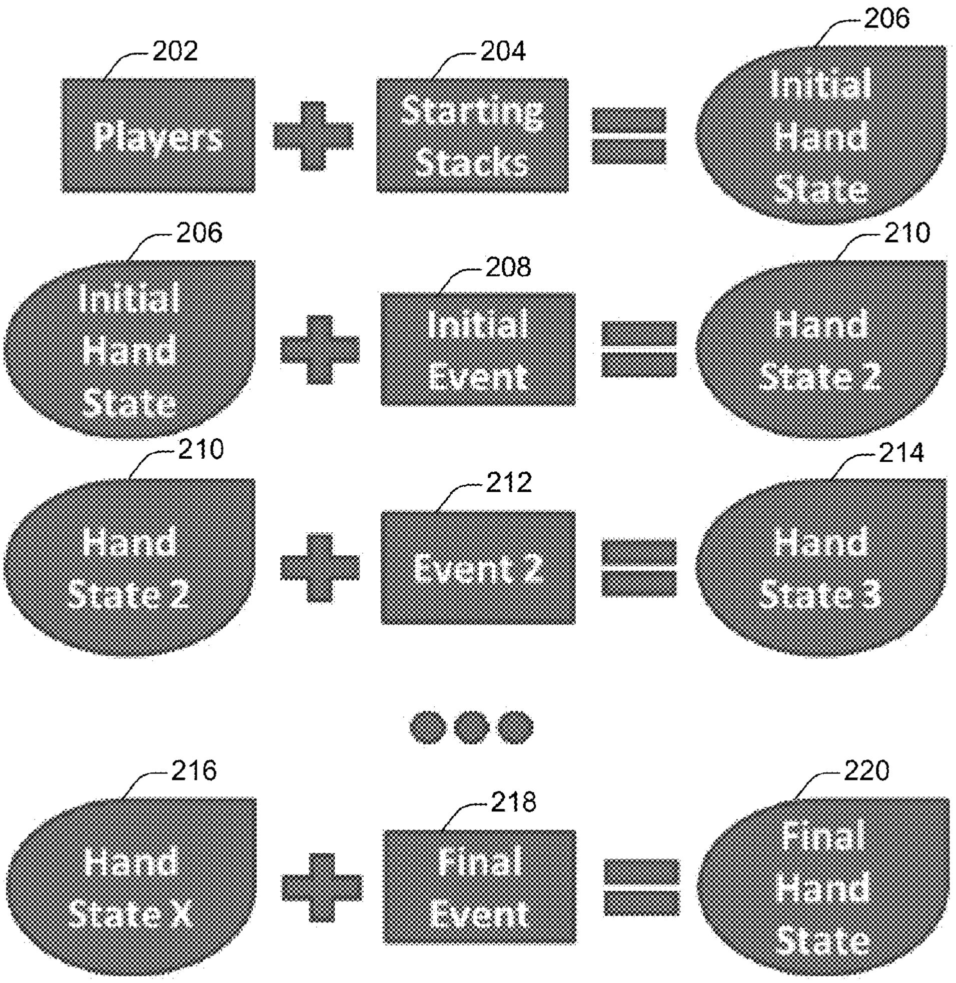
FIG. 2 shows a diagram of a recreation of the events of a hand in temporal order.

FIG. 2 shows a diagram of a recreation of the events of a hand in temporal order. According to various embodiments, the events of the hand may be reconstructed to determine the different states that occurred during the hand and the events that led from one state to another state. A state may include information specific to a given time during the poker hand such as which cards were held by which players, the size of each player's stack, the size of any pots in play, and which players are still in the hand and have not folded at the given time.

According to various embodiments, upon receiving a hand history, the initial state of the hand 206 is recreated based on information about the players 202 and their starting stacks 204. Then the events of the hand are processed in temporal order to recreate the various hand states within the hand. For instance, information about the initial hand state 206 is combined with information about the initial event 208 to determine the second hand state 210. Information about the second hand state 210 is combined with information about the second event 212 to determine the third hand states 214. Information about the penultimate hand state 216 is combined with information about the final event 218 is combined to determine the final hand state 220.

Figure 3:
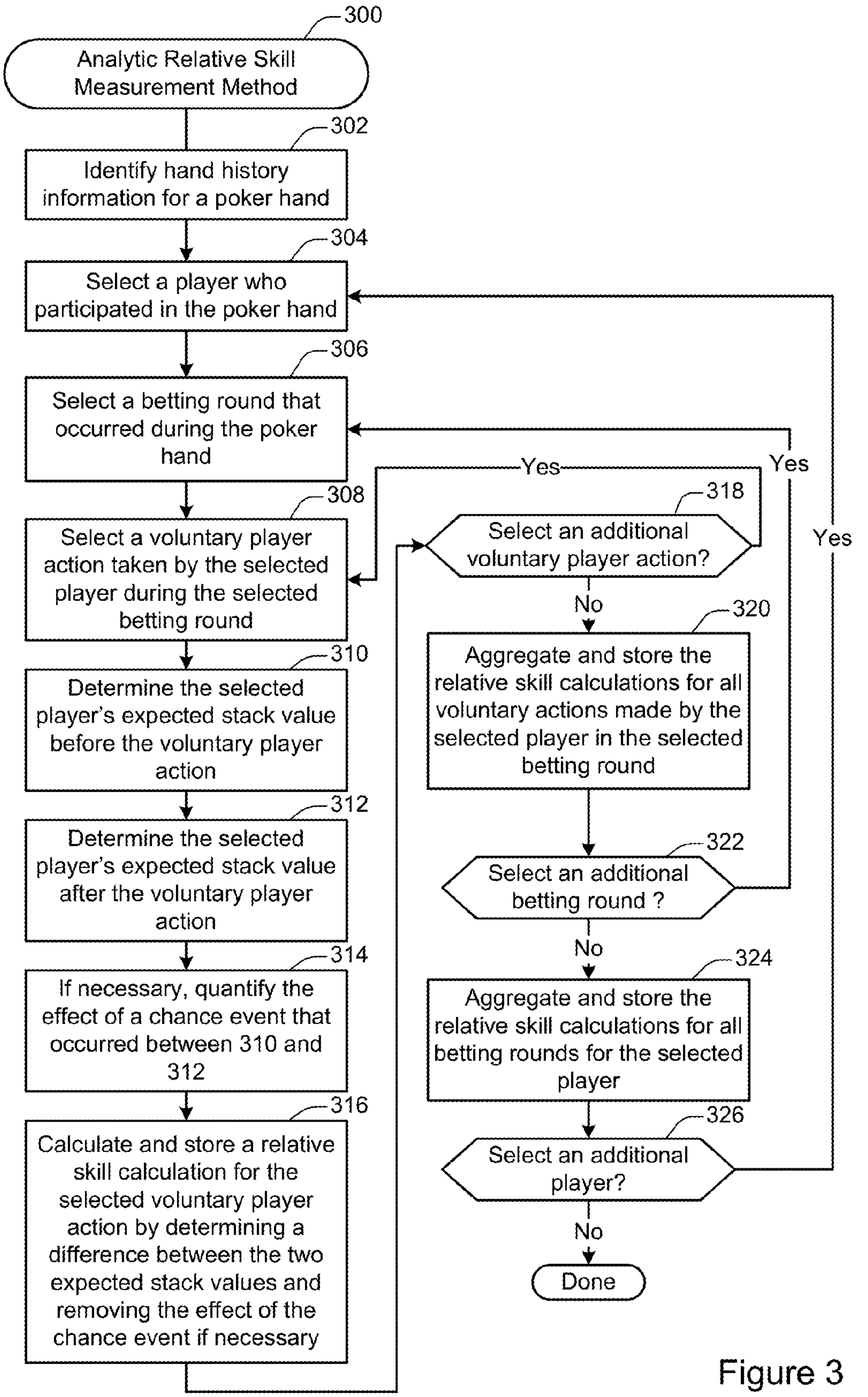
FIG. 3 illustrates a method for analytically measuring relative skill.

FIG. 3 illustrates a method for analytically measuring relative skill during a given poker hand. Analytically measuring relative skill typically involves many complex calculations by a computer. For instance, in a single hand of Texas Hold'em with two players, the relative skill calculations associated with the first betting round can involve the generation of 1,712,304 five-card combinations, as well as the calculations associated with each such combination.

At 302, hand history information for a poker hand is identified. According to various embodiments, the hand history information may be substantially similar to the information discussed with respect to FIGS. 1 and 2. Identifying hand history information may include such operations as receiving hand history information via a network, retrieving hand history information from a storage medium, or processing hand history information.

At 304, a player who participated in the poker hand is selected. According to various embodiments, relative skill measurements may be calculated for any or all players who participated in the poker hand. The players may be analyzed according to some sequence or in any suitable ordering. Players may be identified by name, identification code, or any other identification technique. In some embodiments, a player may be deemed to have participated in a hand if the player was dealt into the hand.

At 306, a betting round is selected for analysis from the hand history information. According to various embodiments, betting rounds may be analyzed sequentially. For instance, a poker hand may include several different betting rounds. The betting rounds may be analyzed in temporal order or in some other order to identify the relative skill of the selected player in those betting rounds.

If the selected player took no voluntary player actions in the selected betting round, which may happen if the player had folded or gone "all-in" in a previous betting round, or for other reasons, then according to various embodiments, the selected player's relative skill for the betting round is calculated as the difference between his/her expected stack at the end of the betting round, and his/her expected stack at the beginning of the betting round.

In various embodiments, "the beginning of the betting round" is understood to mean the moment in time after a given street's chance event, but before the first voluntary player action taken by any player on that street's betting round. Similarly, in various embodiments, "the end of the betting round" is understood to mean the moment in time after the last voluntary player action taken by all players in a given street's betting round, but before the subsequent street's chance event (when there is such a next street).

At 308, if the selected player took one or more voluntary player actions in the selected betting round, then one of those voluntary player actions is selected for analysis. According to various embodiments, the selected player's voluntary player actions may be analyzed sequentially. The voluntary player actions may be analyzed in temporal order or in some other order to identify the relative skill of the selected player for the voluntary player actions that he/she took in the selected betting round.

At 310, the selected player's expected stack value before the selected voluntary player action is calculated. In various embodiments, if the selected voluntary player action is the first voluntary player action taken by the selected player in the selected betting round, then the calculation of the selected player's expected stack value before that voluntary player action may occur before the start of the betting round. In some embodiments, the calculation may be performed immediately prior to the selected voluntary player action.

At 312, the selected player's expected stack value after the selected voluntary player action is calculated. In various embodiments, if the selected voluntary player action is not the last voluntary player action taken by the selected player in the selected betting round, then the calculation of the selected player's expected stack value after the voluntary player action may occur immediately before the selected player's next voluntary player action.

In some embodiments, if the selected voluntary player action is the last voluntary player action taken by the selected player in the selected betting round, then the calculation of the selected player's expected stack value after the selected voluntary player action may occur at the end of the selected betting round.

In yet other embodiments, if the selected voluntary player action is the last voluntary player action taken by the selected player in the selected betting round, then the calculation of the selected player's expected stack value after the selected voluntary player action may occur immediately prior to the selected player's first voluntary player action in the subsequent betting round.

Sometimes, a chance event may occur in between the point at which the selected player's expected stack value before the selected voluntary player action is calculated, and the point at which the selected player's expected stack value after the selected voluntary player action us calculated. When this is the case, in various embodiments, it may be appropriate to quantify and remove the effect of that chance event.

At 314, an additional calculation may be performed, to quantify the effect of the aforementioned chance event. In various embodiments, this quantification consists of taking the difference between the selected player's expected stack at the beginning of the betting round associated with the street on which the chance event occurred, and the end of the betting round associated with the previous street.

According to various embodiments, each expected stack value may be calculated by summing the player's current stack with the amount that the player should receive in expectation from any pots that, at the designated point in time, the player is a candidate to win or share. For instance, a player may have a current stack of $67 in a betting round in which the player has a 25% chance to win and a 10% chance to split (between two players) a main pot of $20 as well as a 50% chance to win a side pot of $16 and a 75% chance to win another side pot of $8. In this situation, the player's expected stack is ($67+{[25%*$20+10%*$20/2]+[50%*$16]+[75%*$8]}=$67+$6+$8+$6=$87.

At 316, a relative skill calculation is made and stored for the selected voluntary player action. In various embodiments, this relative skill calculation involves taking the difference between the expected stack value calculated after the selected voluntary player action (described at 312), and the expected stack value calculated before the selected voluntary player action (described at 310). In some other embodiments, and in particular whenever a chance event occurs between the points at which the calculations at 312 and 310 are made, it is permissible to subtract the quantity described at 314 from the difference calculated in the previous sentence, to arrive at a final relative skill calculation.

At 318, a determination is made as to whether to select an additional voluntary player action by the selected player in the selected betting round for analysis. According to various embodiments, the selected player may take one, two, or several voluntary player actions within the poker round. Each or selected ones of these voluntary player actions may be selected for analysis.

At 320, the relative skill calculations for the selected player during the selected betting round are aggregated and stored. According to various embodiments, aggregating the relative skill calculations may involve determining a sum of the respective relative skill calculations for each of the voluntary player actions taken by the selected player during the betting round.

At 322, a determination is made as to whether to select an additional betting round for the selected player. According to various embodiments, various types of criteria may be used to select betting rounds. For example, for some poker hands, each betting round in the hand may be analyzed. As another example, for some poker hands, each betting round that includes a particular target player as an active participant may be selected for analysis.

At 324, the relative skill calculations for the selected player are aggregated over all betting rounds, and subsequently stored. According to various embodiments, aggregating the relative skill calculations for the player across betting rounds may involve determining a sum of the respective relative skill calculations for each betting round in which the player participated. For instance, a sum of the aggregated expected stack changes determined at operation 320 may be calculated and stored.

At 326, a determination is made as to whether to select an additional player for analysis. As discussed with respect to operation 304, any or all players who participated in the poker hand may be selected for analysis.

It should be noted that not every operation shown in FIG. 3 need be performed for any particular implementation or instantiation of the method. For example, in some betting rounds, a player may not have taken any voluntary player actions. For such a player in such a betting round, operations 308-320 may be omitted. As another example, in some betting rounds and/or for some types of poker, a chance event may not occur between the points at which the selected expected stack values—one before the selected voluntary player action, and one after—were calculated. In such cases, operation 314 may be omitted.

Although the operations shown in FIG. 3 are presented in a particular order for purposes of explanation, the operations may be performed in a variety of orders. It should also be noted that the example method shown in FIG. 3 is only one possible way to determine a player's relative skill level for a hand. For instance, another way to perform this determination is to first calculate, for a given player, his/her profit or loss in a given hand. Then, a sum of the player's changes in expected stack value due to forced action and chance events (i.e. changes due to factors other than skill) may be determined. Next, the sum of the player's changes in expected stack value due to forced action and chance events may be subtracted from his/her total profit to determine the change in expected stack value that is attributable to relative skill.

Following are a number of functions that convey the logic associated with the calculation of players' expected stacks.

This pseudo-code is written in the Python style, for the sake of readability, and is written explicitly for a particular poker variant called Texas Hold'em. It is important to note that this pseudo-code is not real computer code, and is intended only to convey a sense of the general logic of an expected stack calculation in a particular context, and to enable a person of ordinary skill in the art to write computer code in the language of their choice, for example C++, Visual Basic or other programming languages. It is also important to note that, for this pseudo-code, that context is Texas Hold'em, which is one of many poker variants. Logic for any other poker variant will necessarily be different than the logic presented below, because of the inherent differences between that poker variant and Texas Hold'em. Further, such variations will be readily apparent to one of ordinary skill in the art.

```
calculate__expected__stacks( ):
    set__expected__stacks__equal__to__stacks( )
    for pot__index in range(number__of__pots):
        calculate__pot__won(pot__index)
    add__pots__won__to__expected__stacks( )
set__expected__stacks__equal__to__stacks( ):
    for player in players:
        if player.was__dealt__in:
            player.expected__stack = player.current__stack
calculate__pot__won(pot__index):
    if street==PREFLOP and world in (BEFORE__FORCED__ACTION,
                                    AFTER__FORCED__ACTION):
        apportion__pot__won__equally__amongst__players(pot__index)
    elif number__of__players__with__access__to__pot(pot__index) == 1:
        return__pot__won__to__only__remaining__player(pot__index)
    else:
        if street == RIVER:
            apportion__pot__won__amongst__players__with__strongest__hand(pot__index)
        else:
            calculate__expected__pot__won(pot__index)
apportion__pot__won__equally__amongst__players(pot__index):
    per__player__pot = pots[pot__index] / number__of__players__with__access__to__pot(pot__index)
    for player in players:
        if player.has__access__to__pot(pot__index):
            player.pots__won[pot__index] = per__player__pot
return__pot__won__to__only__remaining__player(pot__index):
    for player in players:
        if player.has__access__to__pot(pot__index):
            player.pots__won[pot__index] = pots[pot__index]
apportion__pot__won__amongst__players__with__strongest__hand(pot__index):
    maximum__hand__strength = update__hand__strengths(players, pot__index, board)
    per__winner__pot = (pots[pot__index] /
            number__of__winners(players, pot__index, maximum__hand__strength))
    for player in players:
        if player.has__claim__to__pot(pot__index, maximum__hand__strength):
            player.pots__won[pot__index] = per__winner__pot
calculate__expected__pot__won(pot__index):
    n = 5 − len(board)
    n__card__combinations, increments = get__n__card__combinations(n)
    for n__card__combination in n__card__combinations:
        board.extend(n__card__combination)
        apportion__inc__pot__won__amongst__players__with__strongest__hand(pot__index,
                                                                          increments)
        for i in xrange(n):
            board.pop( )
get__n__card__combinations(n):
    n__card__combinations = combinations(deck, n)
    if DO__MONTE__CARLO and n >= MONTE__CARLO__THRESHOLD:
        n__card__combinations = sample(n__card__combinations,
                                    MONTE__CARLO__SAMPLE)
        increments = MONTE__CARLO__SAMPLE
    else:
        increments = len(n__card__combinations)
    return n__card__combinations, increments
apportion__inc__pot__won__amongst__players__with__strongest__hand(pot__index, increments):
    maximum__hand__strength = update__hand__strengths(players, pot__index, board)
    incremental__pot = (pots[pot__index] /
            number__of__winners(players, pot__index, maximum__hand__strength) /
            increments)
    for player in players:
        if player.has__claim__to__pot(pot__index, maximum__hand__strength):
            player.pots__won[pot__index] += incremental__pot
add__pots__won__to__expected__stacks( ):
    for player in players:
        if player.was__dealt__in:
            for pot in player.pots__won:
                player.expected__stack += pot
```

Figure 4:
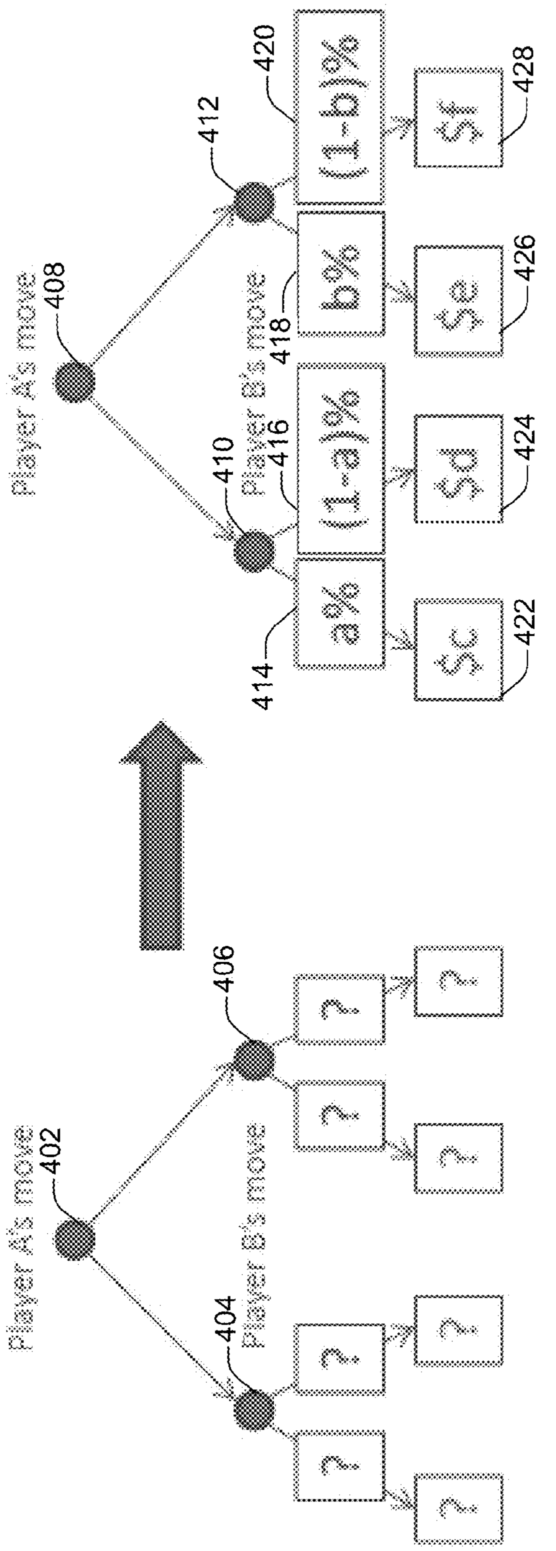
FIG. 4 illustrates a diagram that shows two visual representations of a simplified poker subgame.

FIG. 4 illustrates a diagram that shows two visual representations 402 and 408 of a simplified poker subgame related to a game-theoretic approach to measuring relative skill. According to various embodiments, relative skill may be measured via a game-theoretic approach. A rational poker player's decision process has two inputs: the player's assignment of probability distributions over the private cards held by his/her opponents, and the player's assignment of probability distributions over his/her opponents' strategies.

Assigning probability distributions over the private cards held by his/her opponents allows a theoretical "player" to calculate the expected payoffs of the terminal nodes in the decision tree associated with his/her current subgame (or in the case a computerized process to perform the calculation). For example, if a player who holds the Queen of Hearts and the Queen of Spades is perfectly sure that his/her only opponent holds the corresponding Jacks (of Hearts and Spades) then that player knows that the terminal node associated with an all-in wager of $50 on his/her part, followed by a call on the part of his/her opponent, is worth exactly $32.70 in expected profit:

$$EA[P]=\text{Pot}*\text{Equity}A-\text{Wager}A=\$100*82.7\%-\$50=\$32.70$$

Similarly, assigning probability distributions over opponents' strategies allows a player to calculate the expected payoffs associated with the various non-terminal branches in the decision tree associated with his/her current subgame.

In the subgame shown in FIG. 4, player A may take one of two actions, and in response, player B may take one of two actions. The first visual representation 402 shows the subgame from player A's perspective, before he has made the assignment of probability distributions over the private cards held by his or her opponents, or over his or her opponents' strategies. In this subgame, player A can choose either action 404 and 406.

According to various embodiments, once a rational poker player has made these assignments, his/her rational decision process proceeds as follows. First, the player calculates the expected value of each of his possible actions (given his assignments). Then, the player chooses the action with the highest expected value.

According to various embodiments, the second visual representation 408 shows the subgame from player A's perspective, after he has made the assignments of probability distributions and computed his expected probabilities and payoffs. For instance, player A believes that if he chooses action 410, there is an a % chance that player B will choose action 414 and a (1−a) % chance that player B will choose action 416. If player B chooses action 414, player A will receive an expected value of $c in state 422. If instead player B chooses action 416, player A will receive an expected value of $d in state 424. Similarly, player A believes that if he chooses action 412, there is a b % chance that player B will choose action 418, leaving player A with an expected value of $e in state 426. Player A also believes that if he chooses action 412, there is a (1−b) % chance that player B will choose action 420, leaving player B with an expected value of $f in state 428.

That is, if player A moves into the left subtree, he may see that a % of the time (in expectation), player B will move in such a way that player A's expected payoff is $c, and the remainder of the time, (1−a) %, player B will move in such a way that player A's expected payoff is $d. Therefore the value of the left subtree to player A, given player A's assignments, is $[ac+(1−a)d]/100. Symmetrically, the value of the right subtree to player A, again given player A's assignments, is $[be+(1−b)f]/100. From these two equations, we see that whenever the quantity ac+(1−a)d is greater than the quantity be+(1−b)f, player A will rationally choose to move into the left subtree, and vice versa.

To maximize the expected value associated with a given poker decision, therefore, a player accurately assigns probability distributions over his opponents' private cards and strategies, calculate expected values correctly, and choose rationally between his/her expected value calculations. Since the goal of a poker player is to maximize the expected value of each decision, the just-described rational decision process defines four components of relative skill in poker: accurately assigning probability distributions over opponents' private cards, accurately assigning probability distributions over opponents' strategies, correctly calculating expected values, and rationally choosing between those calculations.

Now suppose that, in the middle of a betting round, immediately prior to player A's next opportunity to act, the hand is temporarily paused, and all players' private cards are turned face-up. Further suppose that each player is now replaced with a perfectly rational computer simulacrum of their former selves. In other words, suppose that when player A takes his next action, he is doing so as a perfectly rational version of him/herself within a complete information variant of his previous poker subgame. Further, in this new subgame, suppose that his opponents are also perfectly rational.

Complete information poker, played by perfectly rational players, has one important property with respect to the definition of game-theoretic relative skill: namely, all players have an identical level of relative skill. To see that this is true, consider the following. In complete information poker, all players may see the private cards of all other players. Therefore all players may trivially assign perfectly accurate probability distributions over their opponents' private cards.

Because all players may see the private cards of all other players, and because all players are perfectly rational, each player may solve for the Nash equilibri(a) of any subgame in which he/she finds him/herself. Knowing said Nash equilibri (a) is equivalent to knowing all players' strategies, which means that all players necessarily make perfectly accurate assignments of probability distributions over their opponents' strategies. Finally, the replacement of players with perfectly rational simulacra of themselves guarantees that with respect to the last two aspects of game-theoretic relative skill—precise calculation and rational choice—all players are of equal skill.

Thus, in the complete information subgame played by perfectly rational simulacra, we know the action taken by simulacrum player A as well as the reactions taken by his/her perfectly rational opponents—these actions and reactions are dictated by the solved Nash equilibria(s). Further, because we know these actions and reactions, we can identify the subsequent state in which simulacrum player A finds him/herself. Moreover, once we have identified that subsequent state, we may precisely measure the expected value for simulacrum player A of being in that state.

Notably, once the Nash equilibria(s) are computed, the expected value of the subgame for simulacrum player A will be the same, regardless of what point in the extensive normal form game tree the measurement is taken. Therefore, taking expected value measurements for simulacrum player A at points in the subgame other than his subsequent state can be performed to compute the expected value of outcomes.

According to various embodiments, in the original incomplete information subgame played by real poker players, we may observe the actual action taken by player A, and the actual reactions taken by player A's opponents. Because these actions and reactions are observable, it is possible to identify the subsequent state in which player A finds him/herself. Moreover, once we have identified that subsequent state, we may measure the expected value for player A of being in that state.

According to various embodiments, these two subgames—the incomplete information subgame played by real poker players and the complete information subgame played by perfectly rational simulacra—are identical in terms of state. The same players sit in the same order with the same stacks and the same private cards, the same public cards have been dealt, and the same prior actions were taken in the same order to create the subgames. The primary difference between these subgames is that one is played by rational players with complete information, and one is played by real players with incomplete information. We may translate this difference into something meaningful by referring to the game-theoretic notion of relative skill. In the incomplete information subgame played by real players, it is not necessarily the case that all players have the same level of relative skill. Whereas in the complete information subgame played by perfectly rational simulacra, it is the case that all players have the same level of relative skill. Since these two subgames are identical except for their assumptions about the relative skill of their players, then measurement differences from these two games may only reflect differences in the relative skill of the real players.

Figure 5:
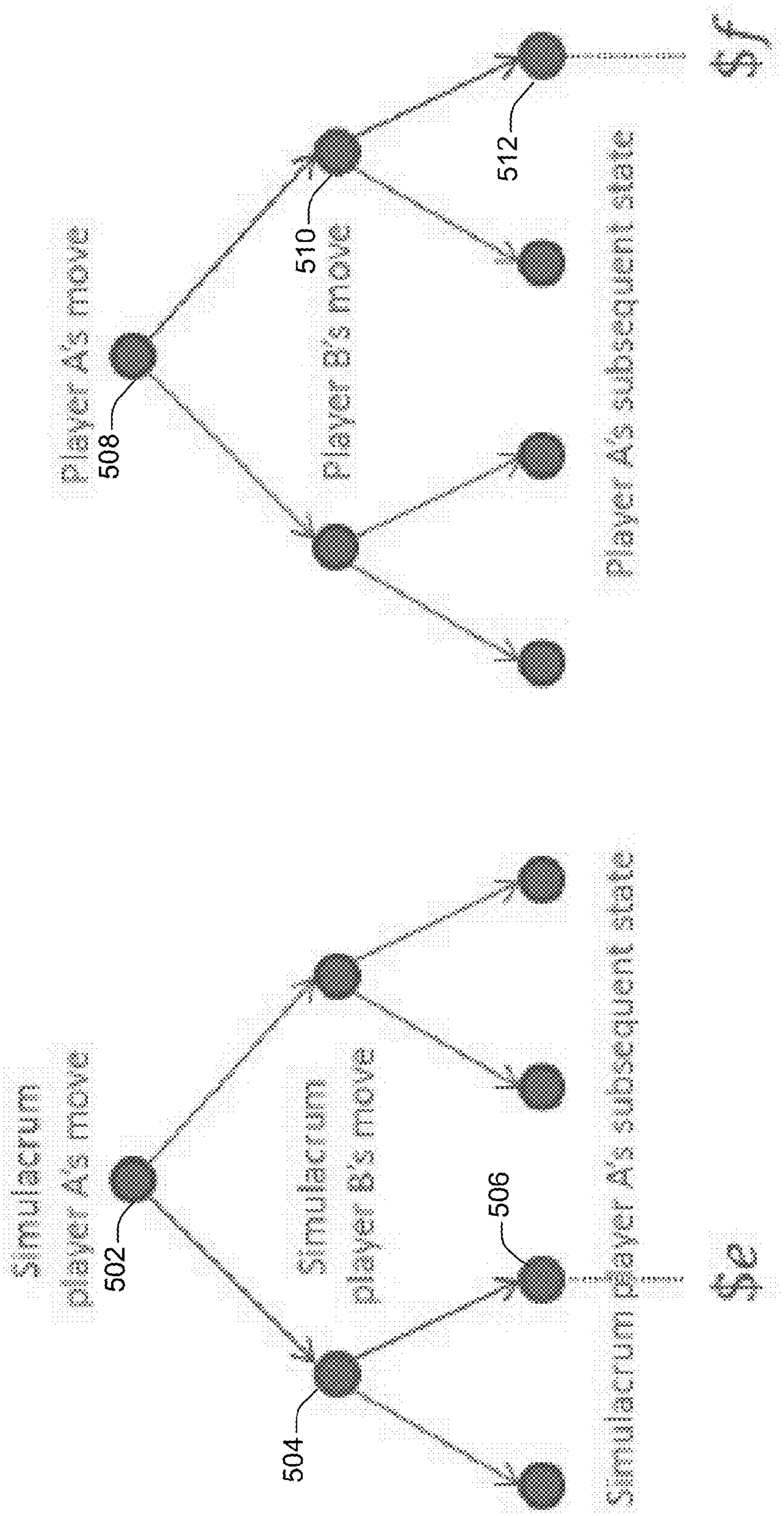
FIG. 5 illustrates a diagram that shows techniques for measuring different expected values of a player.

FIG. 5 illustrates a diagram that shows techniques for measuring different expected values of a player. FIG. 5 includes tree diagrams 502 and 508. Each tree diagram includes a number of nodes each representing a player move or state. For instance, the tree diagram 502 includes the subsequent state 506 that is one possible state that can occur after simulacrum player A's move 504. The tree diagram 508 includes the subsequent state 512 that can occur after player A's move 510.

The tree diagram 502 shows the possible subsequent states for player A's simulacrum in the complete information game. In FIG. 5, $e represents the expected value for simulacrum player A in the state 506. Further, state 506 is the state that is reached in the simplified game of perfect information shown in FIG. 5, where the simulation assumes that both players know the value of the cards. That is, since both players know all information, simulacrum player A knows that simulacrum player B will choose the right branch of the left subtree to optimize simulacrum player B's outcome. Further, $e is at least as good of an expected value for simulacrum player A as simulacrum player A would get if simulacrum player chose the right subtree, knowing that simulacrum player B will choose to optimize simulacrum player B's value.

The tree diagram 508 shows the possible subsequent states for player A in the game of incomplete information. The tree diagram 508 is substantially similar to the tree diagram 502. However, the tree diagram 508 represents the actual play that occurred in the game of imperfect information, when neither player can observe the cards of the other. Thus, the expected value $f represents the expected value for player A after both players have moved.

According to various embodiments, the difference between the expected value for player A's simulacrum of being in its subsequent state in the complete information game and the expected value for player A of being in his/her subsequent state in the incomplete information game may represent the relative skill of player A's action in the incomplete information game. For instance, in FIG. 6, the relative skill S of player A's action may be formalized as: SA=$ f−$e.

Figure 6:
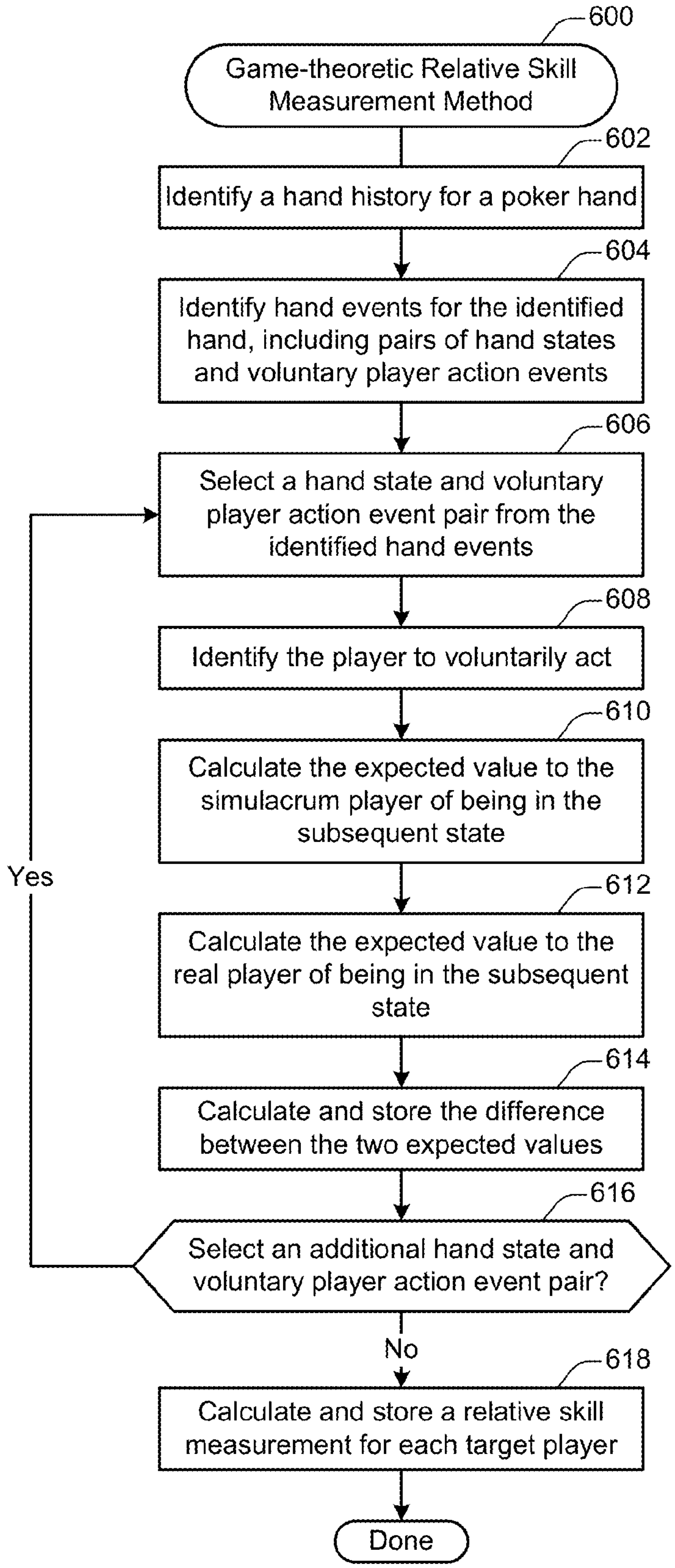
FIG. 6 illustrates a method for measuring game-theoretic relative skill.

FIG. 6 illustrates a method 600 for measuring game-theoretic relative skill measurement. According to various embodiments, solving for Nash equilibria and calculating expected value may involve many calculations complex beyond what can be solved for or even approximated by a human within a reasonable amount of time.

At 602, a hand history for a poker hand is identified. As discussed with respect to FIG. 1, a hand history includes the following information: a unique identifier for the players participating in the hand, the stacks with which each player started the hand, and the events in the hand. Descriptions of the events in the hand must make it possible to discern the temporal order in which these events occurred.

At 604, hand events for the identified hand are identified. According to various embodiments, a hand event may include information such as a hand state and a voluntary player action taken by a player immediately following the occurrence of the hand state. Upon receiving a hand history, a computer program may recreate the initial state of the hand. For instance, the events may be processed in temporal order, updating the state of the hand as each event is processed. As each voluntary player action event is processed, the computer program may store a copy of both the hand state and the voluntary player action event. After the processing, the system may have an in-memory collection of pairs of hand states and voluntary player action events.

At 606, a hand state and voluntary player action event pair is selected from the identified hand events. According to various embodiments, the pairs may be selected in any order. For example, pairs may be evaluated sequentially or in some other order. As another example, pairs may be evaluated when they include voluntary action taken by a target player.

At 608, the player to voluntarily act is identified. According to various embodiments, the player to voluntarily act is the player who decided the action in the hand state and voluntary player action pair. For instance, the player to voluntarily act may have taken an action such as folding, calling, or raising during a particular stage of a poker hand.

At 610, the expected value to the simulacrum player of being in the subsequent state is calculated. According to various embodiments, the calculation may be performed while assuming complete information. That is, the calculation is performed while assuming that the simulated players are aware of each other's cards and perfectly rational.

An example of such a calculation is discussed with respect to FIG. 6. Because each player can see the private cards of all other players, and because and because all players are perfectly rational, each player may solve for the Nash equilibria(s) of any subgame in which he/she finds him/herself. Knowing the Nash equilibria(s) is equivalent to knowing all players' strategies, which means that all players necessarily make perfectly accurate assignments of probability distributions over their opponents' strategies. Then, we know the action taken by simulacrum player A as well as the reactions taken by his/her perfectly rational opponents—these actions and reactions are dictated by the solved Nash equilibri(a). Further, because we know these actions and reactions, it is trivial to identify the subsequent state in which simulacrum player A finds him/herself. Moreover, once we have identified that subsequent state, we may precisely measure the expected value for simulacrum player A of being in that state.

At 612, the expected value to the real player of being in the subsequent state is calculated. In this calculation, the calculation may use the temporally remaining voluntary player action events to carry out the calculation. Because these actions and reactions are observable, it is possible to identify the subsequent state in which player A finds him/herself. Moreover, once we have identified that subsequent state, we may precisely measure the expected value for player A of being in that state.

At 614, the difference between the two expected values is calculated and stored. For instance, the difference may be stored in temporary memory or in a persistent storage medium. In particular embodiments, this stored value represents the game-theoretic relative skill demonstrated by the player associated with that voluntary player action.

At 616, a determination is made as to whether to select an additional hand state and voluntary player action event pair. According to various embodiments, as discussed with respect to operation 606, hand state and action pairs may be processed in various orders, such as sequentially or in some other order. Hand state and player action pairs may continue to be processed until some criteria are met. For instance, hand state and player action pairs may continue to be processed until all hand state and player action pairs in the hand are processed or until all pairs that involve a particular target player or players are processed.

At 618, a relative skill measurement for each target player is calculated. According to various embodiments, after processing each hand state and action pair, a storage medium may have stored a collection of game-theoretic relative skill calculations for each voluntary player action. From this information, the computer program may calculate and store the relative skill demonstrated by each player in the hand by summing over the relative skill calculations of that player's voluntary actions.

According to various embodiments, the choices available to the player at each tree branch in the game-theoretic approach may be determined by identifying discrete choices (e.g., standard betting amounts) available to the player based on the rules of the poker game being analyzed. In some poker variants, the choice space may be continuous. When analyzing such variants, the system may analyze the choice space to identify threshold betting value amounts.

According to various embodiments, the game-theoretic approach to skill measurement conceptually involves setting up a controlled experiment. In the experiment, the state of the poker hand is frozen at a particular action. Then, in the experiment, the system assumes that the players are rational and determines the payoffs that would occur. The difference in the experimental payoffs and the actual payoffs for each player represents that player's relative skill. Thus, the game-theoretic approach to skill measurement does not calculate "perfect" or "optimal" play in a situation. Instead, the game-theoretic approach determines the payoffs from the actions that players would choose if they were perfectly rational and the values of all cards were universally known.

According to various embodiments, the analytic skill measurement approach involves determining a difference between a player's payoffs before and after one or more voluntary actions. Thus, in a manner similar to the game-theoretic approach, the analytic skill measurement approach also does not calculate "perfect" or "optimal" play in a situation. Instead, the analytic skill measurement approach determines how a player's play affected the player's expected outcomes.

In contrast to the aforementioned game-theoretic and analytic approaches to skill measurement, many conventional techniques make various assumptions about a player's opponent. For instance, many conventional techniques assume that a player is playing against "perfect," "optimal," or "theoretically correct" opponents, given some definition of "perfect." However, no universally accepted definition of "perfect" poker play exists. Furthermore, poker players are not machines, and actions that perform well against some opponents may not perform well against other performance. For example, a player may believe that his opponent frequently bluffs or that his opponent holds particular cards and choose his or her actions accordingly. Forming these beliefs is part of the skill involved in good poker play and should be incorporated into an accurate measure of poker skill.

According to various embodiments, when calculating expected stack or payoff value for a particular player at a particular point during a poker game, a number of considerations may be important. These considerations may include, but are not limited to, the following. A poker game may have some number of pots in play, including a main pot and some number of side pots. A particular player may be eligible to win money from some or all of these pots depending on the events that have occurred. For any pot for which the player is eligible, a player may have some probability of winning it, some probability of losing it, and some combinations of one or more opponents with whom he might share it, with one probability per sharing combination. For each pot for which the player is eligible, the player's expected payoff for that pot may be determined by the multiplying the probability of an outcome (e.g., winning the pot or sharing the pot) by the value of the outcome (e.g., the entire pot, a shared portion of the pot). Then, the player's total expected stack may be determined by summing the expected values for each pot available on the table in which the player has a stake.

According to various embodiments, various techniques described herein may be adjusted in various ways without departing from the scope of the disclosure. For instance, various techniques may be used when analyzing the change in expected stack due to the blinds in the antes. For example, one technique is to treat the change as due to luck or chance. As another example, one technique is to treat the change as a different type or category of event.

According to various embodiments, probability when calculating expected stack values may be applied to different quantities. For example, quantity to apply probability to is a player's current stack. As another example, a different quantity to apply probability to is the aggregate bets made by a player over the course of a round.

According to various embodiments, techniques described herein may be employed to estimate relative skill in poker played via online gaming. In online gaming, poker games are often hosted by one or more servers to which players join, each player being identified by their account or player identification number. Data concerning the private and public cards, bets and other actions of each player are collected when input by the players or generated by the poker game software. This data may then be provided to a relative skill calculation software module either integrated with the poker game, or existing as standalone software and run locally, or at a remote server. The provision of data may be accomplished via the Internet or other computer network. Alternately, or additionally, the provision of data may be carried on a data storage device to the relevant computer running the skill calculation software module for processing. The data may then be processed in accordance with embodiments of the present invention described herein, and the relative skill levels of players may be calculated. Such relative skill levels may then be provided to the players themselves, the gaming software or some other intermediary for use in grouping players of similar skill together, as well as for performance tracking of players. Players may, for example, be automatically assigned to skill groupings based on their scores.

According to various embodiments, techniques described herein may be employed to estimate relative skill in poker played at physical poker tables. Such data may be collected and analyzed in real time or aggregated for analysis at a later time. For example, live action poker tournaments may be analyzed to measure the relative skill of participants. As another example, the play of a poker player in a casino may be analyzed to determine a relative skill measurement for the player. In some implementations, hand history data for a physical poker table may be collected by analyzing data received from various types of sensors located at or near the poker table.

Figure 7:
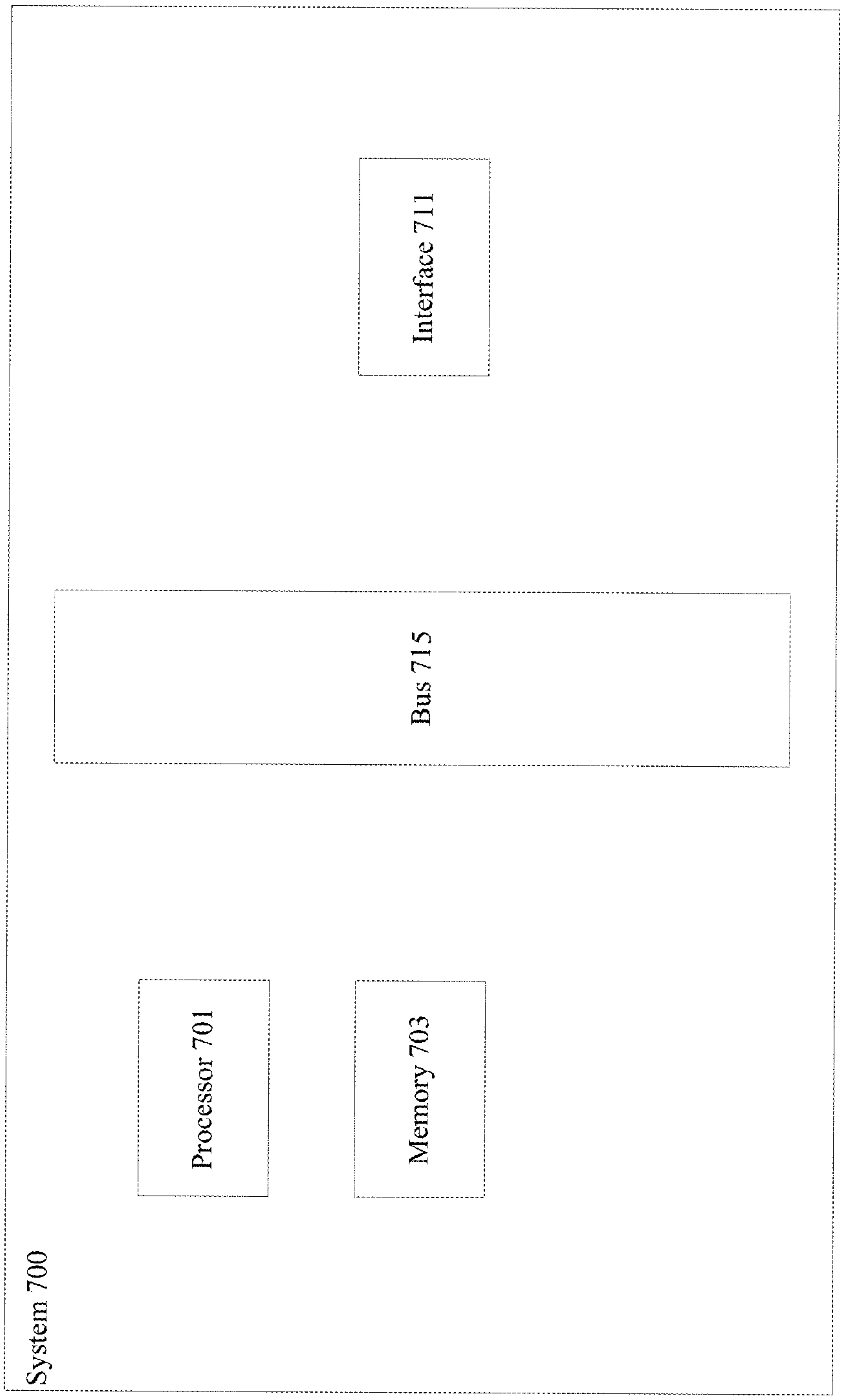
FIG. 7 illustrates one example of a computing device such as a server.

FIG. 7 illustrates one example of a computing device such as a server. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for processing hand data to determine information related to relative skill. Various specially configured devices can also be used in place of a processor 701 or in addition to processor 701. The interface 711 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

It should also be noted that the techniques described herein may be implemented in a variety of computer systems. The various techniques described herein may be implemented in hardware or software, or a combination of both. The techniques may be implemented in computer programs executing on programmable computers that each include a processor, a storage medium readable by the processor (including volatile and non-volatile memory and/or storage elements), one or more input device, and one or more output device. Program code may be applied to data entered using the input device to perform the functions described above and to generate output information. The output information may be applied to one or more output devices. Each program may be implemented in a high level procedural or object oriented programming language to communicate with a computer system. However, the programs can be implemented in assembly or machine language, if desired. In any case, the language may be a compiled or interpreted language.

A computer program may be stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner. Further, the storage elements of the exemplary computing applications may be relational or sequential (flat file) type computing databases that are capable of storing data in various combinations and configurations.

Although a particular computing device is described, it should be recognized that a variety of alternative configurations are possible. For example, some modules such as a report and logging module and a monitor may not be needed on every server. Alternatively, the modules may be implemented on another device connected to the server. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising: determining, with a computer processor, a first expected stack value for a designated player immediately prior to a first voluntary player action event characterizing a first action taken by the designated player in a poker hand and a second expected stack value for the designated player immediately prior to a second voluntary player action event characterizing a second action taken by the designated player in the poker hand, wherein the first action precedes the second action, wherein each expected stack value represents a respective combination of a respective first amount of money or chips that the designated player possesses and has not yet committed to the poker hand with a respective second amount of money or chips that the designated player will receive in expectation from one or more pots associated with the poker hand, wherein the amount of money or chips that the designated player will receive in expectation from a pot is calculated by summing the product of the probability that the designated player will win the pot and the value of the pot if won with a sum of the products of the probability that the designated player will share the pot and the value of the pot if shared, for all unique combinations of opponents with whom the player may share the pot; determining, with the computer processor, a designated relative skill score for the designated player by calculating a difference between the second expected stack value and the first expected stack value; and storing the designated relative skill score on a storage medium.

2. The method recited in claim 1, wherein a plurality of relative skill scores are determined for the designated player during the poker hand, each of the plurality of relative skill scores being associated with a respective one of a plurality of betting rounds, the plurality of relative skill scores including the designated relative skill score.

3. The method recited in claim 2, the method further comprising:

determining an aggregate relative skill score for the designated player during the poker hand by calculating a sum of the plurality of relative skill scores.

4. The method recited in claim 1, wherein determining the designated relative skill score comprises subtracting an effect of one or more chance events from the difference between the second and first expected stack values.

5. The method recited in claim 1, wherein the first and second expected stack values are determined based on hand history information, the hand history information describing each player's stack at the start of the hand and the events that occurred over the course of the hand.

6. The method recited in claim 1, wherein the betting round includes a plurality of voluntary player actions, the plurality of voluntary player actions including the voluntary player action event.

7. A system comprising: a communications interface operable to receive hand history information describing events that occurred over the course of a poker hand; a processor operable to: determine a first expected stack value for a designated player immediately prior to a voluntary player action event characterizing a first action taken by the designated player in the poker hand and a second expected stack value for the designated player immediately prior to a second voluntary player action event characterizing a second action taken by the designated player in the poker hand, wherein the first action precedes the second action, wherein each expected stack value represents a respective combination of a respective first amount of money or chips that the designated player possesses and has not vet committed to the poker hand with a respective second amount of money or chips that the designated player will receive in expectation from one or more pots associated with the poker hand, wherein the amount of money or chips that the designated player will receive in expectation from a pot is calculated by summing the product of the probability that the designated player will win the pot and the value of the pot if won with the sum of the products of the probability that the designated player will share the pot and the value of the pot if shared, for all unique combinations of opponents with whom the player may share the pot; and determine a designated relative skill score for the designated player by calculating a difference between the second expected stack value and the first expected stack value; and a storage system operable to store the designated relative skill score.

8. The system recited in claim 7, wherein a plurality of relative skill scores are determined for the designated player during the poker hand, each of the plurality of relative skill scores being associated with a respective one of a plurality of betting rounds, the plurality of relative skill scores including the designated relative skill score.

9. The system recited in claim 8, wherein the processor is further operable to:

determine an aggregate relative skill score for the designated player during the poker hand by calculating a sum of the plurality of relative skill scores.

10. The system recited in claim 7, wherein determining the designated relative skill score comprises subtracting an effect of one or more chance events from the difference between the second and first expected stack values.

11. One or more non-transitory computer readable media having instructions stored thereon for performing a method, the method comprising: determining, with a computer processor, a first expected stack value for a designated player immediately prior to a voluntary player action event characterizing a first action taken by the designated player in a poker hand and a second expected stack value for the designated player immediately prior to a second voluntary player action event characterizing a second action taken by the designated player in the poker hand, wherein the first action precedes the second action, wherein each expected stack value represents a respective combination of a respective first amount of money or chips that the designated placer possesses and has not vet committed to the poker hand with a respective second amount of money or chips that the designated placer will receive in expectation from one or more pots associated with the poker hand, wherein the amount of money or chips that the designated player will receive in expectation from a pot is calculated by summing the product of the probability that the designated player will win the pot and the value of the pot if won with the sum of the products of the probability that the designated player will share the pot and the value of the pot if shared, for all unique combinations of opponents with whom the player may share the pot; determining, with the computer processor, a designated relative skill score for the designated player by calculating a difference between the second expected stack value and the first expected stack value; and storing the designated relative skill score on a storage medium.

12. The one or more computer readable media recited in claim 11, wherein a plurality of relative skill scores are determined for the designated player during the poker hand, each of the plurality of relative skill scores being associated with a respective one of a plurality of betting rounds, the plurality of relative skill scores including the designated relative skill score.

13. The one or more computer readable media recited in claim 12, the method further comprising:

determining an aggregate relative skill score for the designated player during the poker hand by calculating a sum of the plurality of relative skill scores.

14. The one or more computer readable media recited in claim 11, wherein determining the designated relative skill score comprises subtracting an effect of one or more chance events from the difference between the second and first expected stack values.

* * * * *